United States Patent [19]

Schönig et al.

[11] Patent Number: 4,720,365

[45] Date of Patent: Jan. 19, 1988

[54] MANUFACTURE OF DETERGENT BARS

[75] Inventors: Erich Schönig, Mannheim; Hans Brückel, Hockenheim, both of Fed. Rep. of Germany

[73] Assignee: Lever Brothers Company, New York, N.Y.

[21] Appl. No.: 861,618

[22] Filed: May 6, 1986

Related U.S. Application Data

[63] Continuation of Ser. No. 102,066, Dec. 10, 1979, abandoned, which is a continuation of Ser. No. 608,607, Aug. 28, 1975, abandoned, which is a continuation of Ser. No. 433,171, Jan. 14, 1974, abandoned, which is a continuation of Ser. No. 230,371, Feb. 29, 1972, abandoned.

[30] Foreign Application Priority Data

Jul. 1, 1971 [GB] United Kingdom ............... 30783/71
Jul. 1, 1971 [GB] United Kingdom ............... 57385/71

[51] Int. Cl.[4] ............................................. B29C 47/04

[52] U.S. Cl. ..................................... 264/75; 264/102; 264/148; 264/171; 264/211.11; 264/320; 425/131.1; 425/197; 425/376 R

[58] Field of Search ................. 264/75, 102, 148, 211, 264/171, 320, 211.11; 425/382 R, 464, 197, 131.1, 376 R, 198

[56] References Cited

U.S. PATENT DOCUMENTS

| | | | |
|---|---|---|---|
| 2,213,772 | 9/1940 | Strain | 425/376 R |
| 2,767,437 | 10/1956 | Marshall | 425/197 |
| 3,485,905 | 12/1969 | Compa et al. | 264/75 |
| 3,676,538 | 7/1972 | Patterson | 264/245 |
| 4,162,288 | 7/1979 | Hunt et al. | 264/75 |
| 4,222,979 | 9/1980 | Hunt et al. | 264/75 |
| 4,224,266 | 9/1980 | Hunt et al. | 264/75 |
| 4,304,745 | 12/1981 | Alderson et al. | 264/75 |

FOREIGN PATENTS DOCUMENTS 909,765 11/1962 425/464

*Primary Examiner*—Jeffery Thurlow
*Attorney, Agent, or Firm*—James J. Farrell

[57] ABSTRACT

A method and apparatus for preparing multicolored soap bars by injecting a colored liquid phase into a soap mass wherein (i) The soap mass is passed through an apertured plate to form rods,
(ii) The liquid phase is introduced between the rods in at least one position,
(iii) The rods are compressed inwardly to form a continuous mass having striations of the liquid phase therein, and
(iv) The mass is extruded into a bar.

7 Claims, 4 Drawing Figures

MANUFACTURE OF DETERGENT BARS

This is a continuation of Ser. No. 102,066 filed Dec. 10, 1979 and now abandoned, which is a continuation of 608,607 filed Aug. 28, 1975 and now abandoned, which was a continuation of Ser. No. 433,171 filed Jan. 14, 1974 and now abandoned which was a continuation of Ser. No. 230,371 filed on Feb. 29, 1972 and now abandoned.

BACKGROUND OF THE INVENTION

1. Field of the invention

This invention relates to a process and apparatus for the continuous preparation of striped or marbled detergent bars. The invention is particularly directed to coloured liquid injection into a soap mass so that a multicoloured striped, marbled or mottled bar is the end product.

2. The prior art

Processes are already known according to which soaps with coloured stripes can be prepared. It has been suggested, for example, that coloured soap can be prepared by bringing different coloured soap rods together and compressing them. Tablets of soap made in this way contain sharply defined stripes, but it is not possible to produce soaps with very fine striations according to this process. It was also found that the use of an additional mixing device, which is required by this process, makes the capacity of the plant much smaller than that of a normal soap plodder.

Processes are also known for the preparation of striped soap by incorporating in the soap mass solutions or dispersions of dyes in the conveyor or vacuum section of the plodder. The striped effects achieved in this way are not satisfactory, because uncontrollable mixing, particularly in the worm section of the plodder, causes the stripes to be smeared or to disappear. Because the mixing is more vigorous inside the soap rod than at the edges, soap tablets prepared in this way have a satisfactory striped pattern on the surface of the tablet, but the stripes disappear in the middle, and so such tablets rapidly become plain in use.

SUMMARY OF THE INVENTION

By the use of the process and apparatus according to the invention, the above disadvantages can be avoided in a technically simple manner.

Accordingly, it is an object of the present invention to prepare multicoloured detergent bars of satisfactory appearance and structure.

DESCRIPTION OF THE INVENTION

The invention provides a process of introducing a liquid phase into a detergent mass, wherein (i) the detergent mass is passed through an apertured plate to form rods, (ii) the liquid phase is introduced between the rods in at least one position, and (iii) the rods are compressed inwardly to form a continuous mass having striations of the liquid phase therein.

The liquid phase spreads over and coats the outside surfaces of the rods. The liquid phase contains an additive, e.g. a dye required to be distributed within the detergent mass.

It has been found that, when solutions or dispersions that differ in appearance from the detergent mass are injected continuously between a perforated plate that is positioned after the worm compressor of the plodder and the point where the detergent rod leaves the plodder, i.e. in the conical section of the plodder, a great variety of stripes can be produced, which traverse uniformly through the detergent rod and thus also in the tablets made from it. The term detergent as used herein is to define the surface active materials used in the manufacture of solid shaped masses. This term includes the conventional fatty acid soaps i.e. alkali metal salts of long-chain ($C_{10}$–$C_{20}$) fatty acids, e.g. sodium tallow soap, and synthetic detergent materials, e.g. ethoxylated long chain alcohols, water-soluble salts of alkylaryl sulphonates, alkyl sulphates, alcohol sulphates, alkane sulphonates and sulphonated long chain fatty acids.

Very satisfactory results are obtained if the liquid is injected directly downstream of or close to, the perforated plate.

The invention also includes a soap plodder comprising a perforated plate and an extrusion nozzle of decreasing sectional area positioned downstream of the plate, characterized in the provision of liquid introduction means at or adjacent to the perforated plate.

The process and apparatus of the invention thus distribute a liquid phase throughout a detergent mass in the form of stripes and this effect is achieved with only a small number of introduction points relative to the number of soap rods. Only one injection point can provide satisfactory distribution throughout the bar.

According to the invention, use is preferably made of injection tubes (with or without nozzles), which are conveniently mounted on the perforated plate or form part of it and project 0–100 mm and preferably about 10 mm from the perforated plate in the direction of flow of the detergent mass. The injection tubes are fed by a number of metering pumps or by one multiple-head metering pump, so that the injection points can be controlled individually, and the quantity fed in at each injection point can be regulated, thus permitting the production of, eg detergent tablets with several different-coloured stripes.

It has been shown that, for producing a number of coloured stripes, it is not necessary to inject the coloured solutions or dispersions at every hole in the perforated plate, or even at a large number of these holes. It has in fact been found that a coloured solution introduced through a single injection point is distributed over the whole cross-section of the detergent bar, so that it forms roughly three times as many coloured stripes as there are holes in the perforated plate. A single injection tube is therefore sufficient to provide a detergent bar with a number of stripes, because the injected solution is distributed in the interstices between the individual rods of the detergent rod downstream of the perforated plate. The conical shape of the end section of the plodder causes the rodlets, which at first have a round cross-section, to assume increasingly a hexagonal cross-section, and presses the injected solutions to the edges. The detergent is thus traversed by stripes with a hexagonal cross-section; however, the latter is usually distorted during further processing of the detergent bar, particularly when the tablets are stamped out.

It is obvious that the number of stripes can be varied by altering the number of holes in the perforated plate. It must be emphasised that detergent tablets also with very fine striations can be produced with the aid of the process and apparatus according to the invention.

Although a single injection point gives a number of stripes, it is advisable to use several injection points in order to ensure that the pattern runs evenly through the detergent bar and, if desired, to produce stripes of several different colours. More than four injection points are usually unnecessary, even when using perforated plates with very many holes.

Because the injected solutions are automatically distributed, as explained above, the injection points can be arranged close to the edge of the perforated plate. At the same time, allowance can be made for the force of gravity by mounting the injection points for the lower half of the plate somewhat further from the edge than those for the upper half (see FIG. 2). The coloured solution or dispersion can be led to the injection points through thin tubes mounted on the perforated plate. It is preferable, however, to put these feed pipes inside the perforated plate, or to drill holes in the plate for this purpose, in order not to impair the flow of the detergent mass. A number of injection liquids different in appearance may be used. The injection tubes may be arranged closer to the edge in the upper half of the perforated plate than in the lower half.

With the arrangement described above, it is possible to produce not only coloured stripes, but also stripes of nacreous pigments, or both at the same time. If solutions of different kinds are injected, it is possible to prevent them from merging by arranging the exit orifices of the injection tubes at different distances from the perforated plate.

Figure 1:
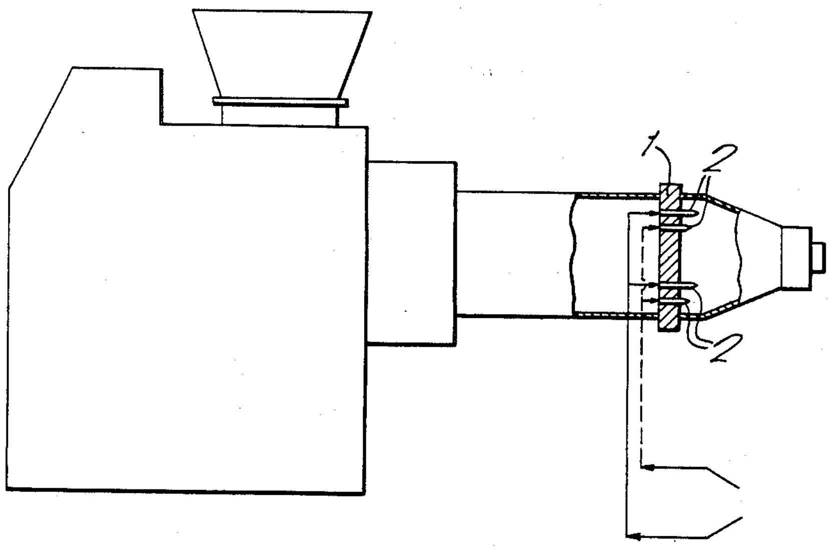
FIG. 1 shows an elevation view of a detergent extrusion apparatus with part of the extrusion nozzle removed to show the interior arrangements.

An embodiment is shown in FIG. 1, in which the perforated plate 1 has injection tubes 2 extending through it and opening downstream.

Figure 2:
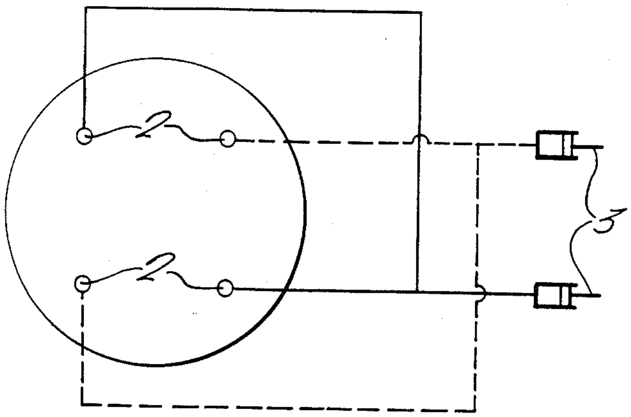
FIG. 2 is an end view of the apertured plate of FIG. 1 showing injection points and metering pumps, the apertures in the plate are not shown.

FIG. 2 shows a section of the arrangement of the injection points 2 and the connection with the metering pumps 3 for the preparation of a soap with stripes of two colours. The apertures in the plate 1 are not shown. In FIG. 1 it is seen that two of the injection points are further downstream than the other pair.

In another embodiment of the invention the apparatus is provided with a second perforated plate positioned parallel to and downstream of the first perforated plate. It has been established that by the presence of this second plate the striped appearance of the soap or detergent bar extruded from the plodder is greatly improved in that the stripes on the soap bar are much smoother. Presumably the second perforated plate effects some twisting and partition of the rather sharp stripes of concentrated colour emerging from the first plate, and so produces a much more agreeable coloured stripe on the tablet. Not more than two secondary plates are necessary and usually one secondary plate situated at a suitable place in the plodder is sufficient to give the desired effect.

These secondary plates may have the same or a different pattern of perforation as that of the first plate, but they should not have a continuous edge attaching to the inner wall of the cone, as otherwise the detergent bar leaving the plodder would largely lose its stripes on the surface.

Figure 3:
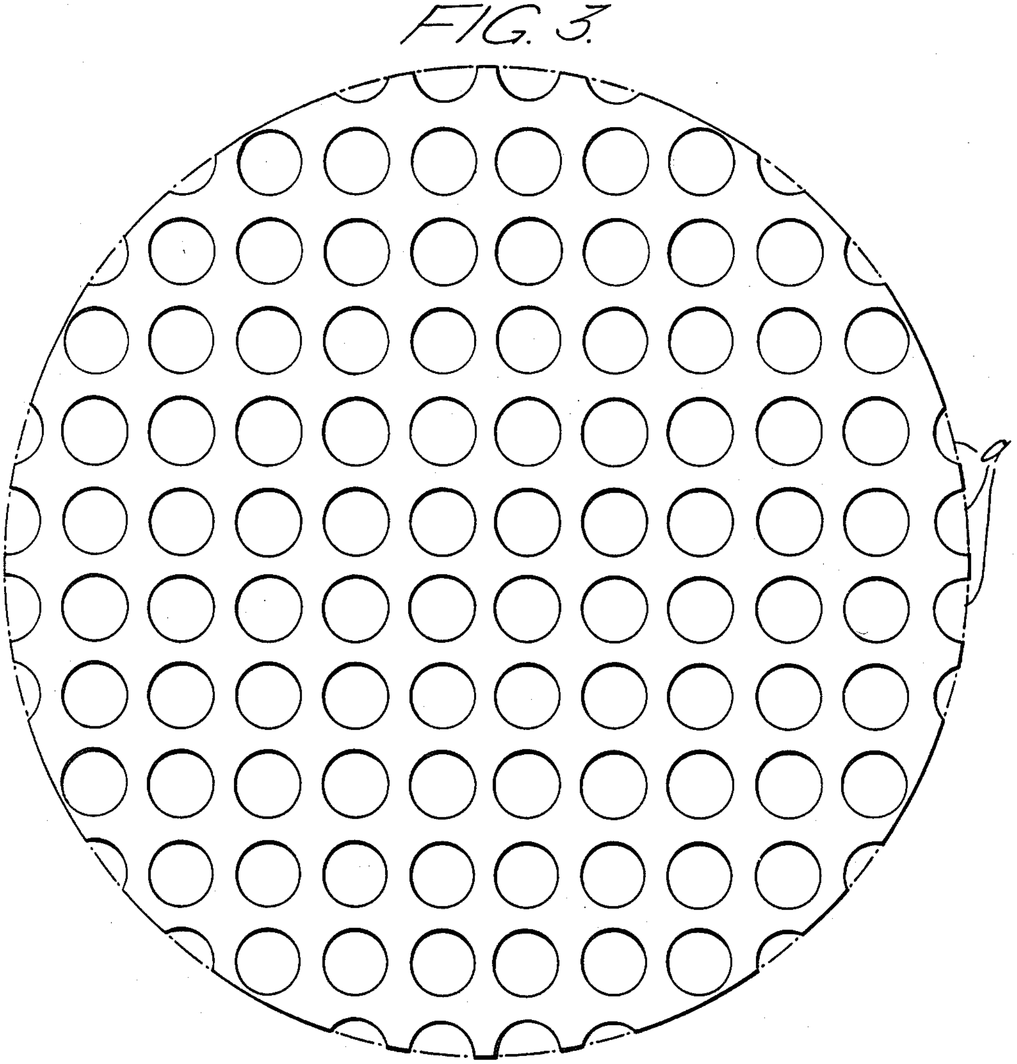
FIG. 3 is an end view of a secondary apertured plate for optional use in the invention.

An example of the secondary perforated plate with interrupted edge is shown in the FIG. 3. The holes (a) on the edge of the plate give passage to the compressed detergent rods, and thus maintain the striped appearance of the detergent bar leaving the plodder.

In order to keep this secondary plate on its place, the inner wall of the cone may be provided with a trench in which the plate fits. Bolts or some other fixing means may be provided to prevent any movement of the plate owing to working forces exerted by the soap or detergent mass within the cone.

Figure 4:
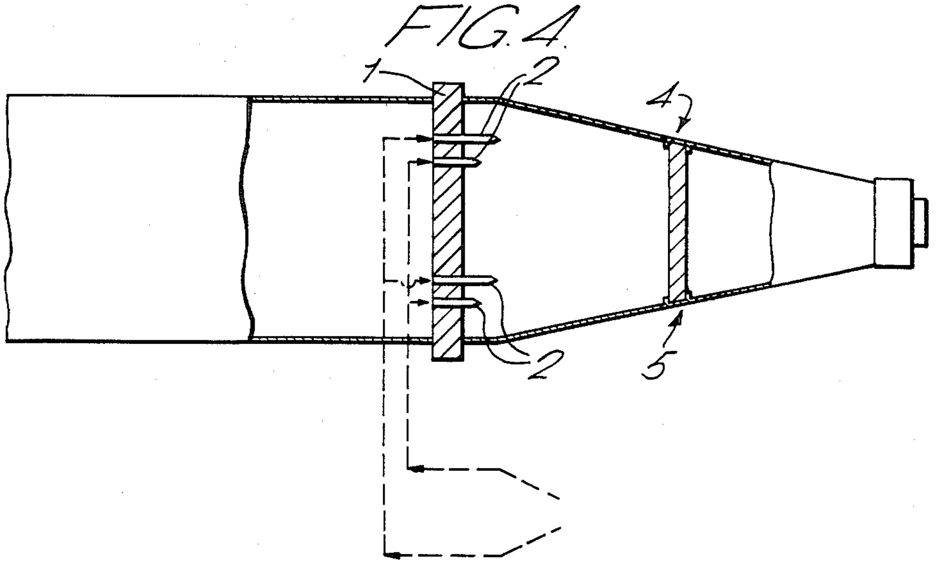
FIG. 4 is a longitudinal sectional view of the relevant part of the soap extrusion apparatus.

FIG. 4 represents a longitudinal view through the relevant part of the soap extrusion apparatus, showing the first perforated plate (1) with injection points (2) and a secondary perforated plate (4) situated in the conical section of the plodder. The secondary plate is kept in its place by trench (5) constructed at the inner wall of the cone.

Stamped bars produced by the process of the invention have a striped appearance of very smooth structure, with stripes running fluently over the bar surface.

An advantage of this striping nature is that it forms a suitable pattern for making quite attractive and eye-appealing variations of striping, by altering the manner of stamping.

A soap tablet having diagonally running stripes can be obtained by changing the angle of stamping.

By rotating the extruded soap bar on its axis a substantially spiral striping is obtained, which on stamping produces tablets showing undulating stripes on their surface.

The extruded bars made by the process of the invention can also be stamped in their longitudinal axial direction, so-called end-on stamping by which a multicoloured soap tablet is obtained having a central mottled area with coloured striations radiating therefrom.

The process according to the invention is particularly suitable for the preparation of nacreous soaps. A transparent soap mass and known nacreous pigments are used for this purpose. The result is a soap having stripes with a silvery lustre, which produce a striking three-dimensional effect.

Water or organic liquids can be used as the solvents or dispersion media for the additives. When water is used, a substance that increases the viscosity, for example, a cellulose ether (or a) polyacrylate, has proved useful. Soap can also be used for this purpose. Such additives are mainly of use when the stripe-former is a coloured pigment.

The invention is explained in greater detail by means of the following illustrative examples.

EXAMPLE I

White toilet soap of the following composition was extruded in a vacuum plodder:

87.0% of anhydrous soap
1.0% of perfume
0.1% of titanium dioxide
11.5% of water
0.4% of common salt The coloured dispersion to be injected had the following composition:

30 g of red disperse dye for soap
2,960 g of water
10 g of Tylose

The setting of the metering pump was as follows:

500 g of coloured dispersion per 100 kg of soap
4 injection tubes with a diameter of 2 mm The resulting soap bars showed exactly the desired striped effect.

EXAMPLE II

White soap with the formulation given in Example I was extruded, but now two different colour dispersions were dispensed, each through two injection tubes, arranged transversally (see FIG. 2).

Colour dispersion I:
30 g of blue disperse dye for soap
10 g of Tylose
2,960 g of water Colour dispersion II:
30 g of green disperse dye for soap
10 g of Tylose
2,960 g of water Quantity metered:
500 g of colour dispersion per 100 kg of soap The soaps obtained were striped in a contrasting way and showed not only the pure colours of the two colour dispersions, but also many stripes with mixed colours.

EXAMPLE III

A transparent soap stock of the following composition was extruded as in Example I:
80.0% of soap stock (transparent)
1.0% of perfume
0.5% of common salt
18.5% of water The following dispersion was injected to produce a nacreous effect:
1,690 g of water
300 g of Iriodin (Merck)
5 g of Tylose Quantity metered:
500 g of Iriodin dispersion per 100 kg of transparent soap.

All these soap bars showed good striping. The feed stock in all cases was sodium salts of long-chain fatty acids.

EXAMPLE IV

A soap/synthetic detergent bar of the following composition was extruded:
44.9% of sodium lauryl isethionate
6.0% of sodium dodecylsulphonate
31.2% of stearic acid soap
7.5% of tallow soap
1.0% of perfume
0.3% of titanium dioxide
9.1% of water The colour dispersion injected had the same composition as in Example 1.

Finely and evenly striped bars were obtained in this experiment as well.

What is claimed is:

1. A process for preparing multicolored detergent bars comprising:
(i) passing a detergent mass through a soap plodder;
(ii) passing said mass through a perforated plate positioned after the worm compressor of said plodder to form a plurality of continuous rods;
(iii) introducing in the interstices between the continuous rods in at least one position downstream of the perforated plate a liquid phase comprising a solution or dispersion of an additive having a different appearance than the detergent mass;
(iv) compressing the continuous rods inwardly to form a continuous mass having striations of the liquid phase therein, and
(v) extruding the mass whereby a bar is formed having stripes distributed over the whole cross-section of said bar.

2. A process as claimed in claim 1, wherein the detergent mass is formed from the alkali metal salts of long chain fatty acids having 10–20 carbon atoms.

3. A process as claimed in claim 1, wherein the liquid phase is injected at a distance of about 0 to 100 mm downstream from the perforated plate.

4. A process as claimed in claim 1, wherein the liquid phase is injected at a distance of about 0 to 10 mm downstream from the perforated plate.

5. A process as claimed in claim 1, wherein the mass after liquid injection and prior to the extrusion into a bar is passed through at least a second perforated plate with additional passages around the edge.

6. A process as claimed in claim 1, wherein the liquid phase includes a dye.

7. A process as claimed in claim 1, wherein the extruded detergent bar is stamped in its longitudinal axial direction.

* * * * *